United States Patent
Nakade et al.

(10) Patent No.: US 9,210,343 B2
(45) Date of Patent: Dec. 8, 2015

(54) IMAGING DEVICE

(71) Applicant: Hitachi Industry & Control Solutions, Ltd., Hitachi-shi, Ibaraki (JP)

(72) Inventors: Mayumi Nakade, Tokyo (JP); Shinichiro Hirooka, Tokyo (JP)

(73) Assignee: Hitachi Industry & Control Solutions, Ltd., Ibaraki (JP)

(*) Notice: Subject to any disclaimer, the term of this patent is extended or adjusted under 35 U.S.C. 154(b) by 0 days.

(21) Appl. No.: 14/459,727

(22) Filed: Aug. 14, 2014

(65) Prior Publication Data

US 2015/0092085 A1   Apr. 2, 2015

(30) Foreign Application Priority Data

Sep. 30, 2013   (JP) ................. 2013-203007

(51) Int. Cl.
*H04N 5/208*   (2006.01)
*H04N 5/357*   (2011.01)
*G06T 5/00*   (2006.01)
*G06T 5/10*   (2006.01)

(52) U.S. Cl.
CPC ............ *H04N 5/357* (2013.01); *G06T 5/002* (2013.01); *G06T 5/10* (2013.01); *G06T 2207/20192* (2013.01)

(58) Field of Classification Search
CPC ... H04N 5/357; H04N 5/35509; H04N 5/217; G06T 5/002; G06T 5/10; G06T 2207/20192; G06T 5/50

USPC .................. 348/252, 254, 255, 354, 355; 382/260–266

See application file for complete search history.

(56) References Cited

U.S. PATENT DOCUMENTS

| | | | | |
|---|---|---|---|---|
| 2008/0122953 | A1* | 5/2008 | Wakahara | G06T 5/10 348/241 |
| 2009/0046943 | A1* | 2/2009 | Ishiga | G06T 5/10 382/266 |
| 2010/0039538 | A1* | 2/2010 | Ikedo | H04N 5/23225 348/241 |
| 2010/0066874 | A1* | 3/2010 | Ishiga | G06T 5/002 348/252 |

FOREIGN PATENT DOCUMENTS

JP   2010-114879 A   5/2010

* cited by examiner

*Primary Examiner* — Yogesh Aggarwal
(74) *Attorney, Agent, or Firm* — Volpe and Koenig, P.C.

(57) ABSTRACT

An imaging device includes an imaging unit, a signal processing unit, a frequency dividing unit, a noise processing unit, a noise frequency unifying unit, an edge processing unit, an edge frequency unifying unit, a synthesizing unit, and a control unit. The control unit controls the rates of the noise processing results of respective frequency components unified by the noise frequency unifying unit, and the rates of the edge processing results of the respective frequency components unified by the edge frequency unifying unit in accordance with control of operations of constituent elements included in the imaging device.

8 Claims, 16 Drawing Sheets

FIG. 5

| | | ZOOM LENS | | | |
|---|---|---|---|---|---|
| | FREQUENCY | WIDE END | INTERMEDIATE 1 | INTERMEDIATE 2 | TELEPHOTO END |
| FREQUENCY UNIFYING UNIT (NOISE REMOVAL) | COMPONENT 1 | REFERENCE VALUE 0_0 | REFERENCE VALUE 1_0 | REFERENCE VALUE 2_0 | REFERENCE VALUE 3_0 |
| | COMPONENT 2 | REFERENCE VALUE 0_1 | REFERENCE VALUE 1_1 | REFERENCE VALUE 2_1 | REFERENCE VALUE 3_1 |
| | COMPONENT 3 | REFERENCE VALUE 0_2 | REFERENCE VALUE 1_2 | REFERENCE VALUE 2_2 | REFERENCE VALUE 3_2 |
| FREQUENCY UNIFYING UNIT (EDGE ENHANCEMENT) | COMPONENT 1 | REFERENCE VALUE 0_3 | REFERENCE VALUE 1_3 | REFERENCE VALUE 2_3 | REFERENCE VALUE 3_3 |
| | COMPONENT 2 | REFERENCE VALUE 0_4 | REFERENCE VALUE 1_4 | REFERENCE VALUE 2_4 | REFERENCE VALUE 3_4 |
| | COMPONENT 3 | REFERENCE VALUE 0_5 | REFERENCE VALUE 1_5 | REFERENCE VALUE 2_5 | REFERENCE VALUE 3_5 |
| SYNTHESIZING UNIT | NOISE REMOVAL | REFERENCE VALUE 0_6 | REFERENCE VALUE 1_6 | REFERENCE VALUE 2_6 | REFERENCE VALUE 3_6 |
| | EDGE ENHANCEMENT | REFERENCE VALUE 0_7 | REFERENCE VALUE 1_7 | REFERENCE VALUE 2_7 | REFERENCE VALUE 3_7 |

| 0_0 | 0_1 | 0_2 | 0_3 | 0_4 | 0_5 | 0_6 |
|-----|-----|-----|-----|-----|-----|-----|
| 1_0 | 1_1 | 1_2 | 1_3 | 1_4 | 1_5 | 1_6 |
| 2_0 | 2_1 | 2_2 | 2_3 | 2_4 | 2_5 | 2_6 |
| 3_0 | 3_1 | 3_2 | 3_3 | 3_4 | 3_5 | 3_6 |
| 4_0 | 4_1 | 4_2 | 4_3 | 4_4 | 4_5 | 4_6 |

| | | FREQUENCY | BLOCK NO. | | |
|---|---|---|---|---|---|
| | | | 0_0 | 0_1 | ... | 4_6 |
| FREQUENCY UNIFICATION | NOISE REMOVAL | COMPONENT 1 | REFERENCE VALUE 0_0_0 | REFERENCE VALUE 0_1_0 | ... | REFERENCE VALUE 4_6_0 |
| | | COMPONENT 2 | REFERENCE VALUE 0_0_1 | REFERENCE VALUE 0_1_1 | ... | REFERENCE VALUE 4_6_1 |
| | | COMPONENT 3 | REFERENCE VALUE 0_0_2 | REFERENCE VALUE 0_1_2 | ... | REFERENCE VALUE 4_6_2 |
| | EDGE ENHANCEMENT | COMPONENT 1 | REFERENCE VALUE 0_0_3 | REFERENCE VALUE 0_1_3 | ... | REFERENCE VALUE 4_6_3 |
| | | COMPONENT 2 | REFERENCE VALUE 0_0_4 | REFERENCE VALUE 0_1_4 | ... | REFERENCE VALUE 4_6_4 |
| | | COMPONENT 3 | REFERENCE VALUE 0_0_5 | REFERENCE VALUE 0_1_5 | ... | REFERENCE VALUE 4_6_5 |
| SYNTHESIS | NOISE REMOVAL | | REFERENCE VALUE 0_0_6 | REFERENCE VALUE 0_1_6 | ... | REFERENCE VALUE 4_6_6 |
| | EDGE ENHANCEMENT | | REFERENCE VALUE 0_0_7 | REFERENCE VALUE 0_1_7 | ... | REFERENCE VALUE 4_6_7 |

FIG. 18

| | | DISTANCE FROM CENTER | | | |
|---|---|---|---|---|---|
| | FREQUENCY | CENTER | DISTANCE A | DISTANCE B | DISTANCE C |
| NOISE REMOVAL | COMPONENT 1 | CORRECTION VALUE 0_0 | CORRECTION VALUE A_0 | REFERENCE VALUE B_0 | REFERENCE VALUE C_0 |
| | COMPONENT 2 | CORRECTION VALUE 0_1 | REFERENCE VALUE A_1 | REFERENCE VALUE B_1 | REFERENCE VALUE C_1 |
| | COMPONENT 3 | CORRECTION VALUE 0_2 | REFERENCE VALUE A_2 | REFERENCE VALUE B_2 | REFERENCE VALUE C_2 |
| EDGE ENHANCEMENT | COMPONENT 1 | CORRECTION VALUE 0_3 | REFERENCE VALUE A_3 | REFERENCE VALUE B_3 | REFERENCE VALUE C_3 |
| FREQUENCY UNIFICATION | COMPONENT 2 | CORRECTION VALUE 0_4 | REFERENCE VALUE A_4 | REFERENCE VALUE B_4 | REFERENCE VALUE C_4 |
| | COMPONENT 3 | CORRECTION VALUE 0_5 | REFERENCE VALUE A_5 | REFERENCE VALUE B_5 | REFERENCE VALUE C_5 |
| SYNTHESIS NOISE REMOVAL | | CORRECTION VALUE 0_6 | REFERENCE VALUE A_6 | REFERENCE VALUE B_6 | REFERENCE VALUE C_6 |
| SYNTHESIS EDGE ENHANCEMENT | | CORRECTION VALUE 0_7 | REFERENCE VALUE A_7 | REFERENCE VALUE B_7 | REFERENCE VALUE C_7 |

IMAGING DEVICE

CROSS-REFERENCE TO RELATED APPLICATION

This is application claims the priority of Japanese Patent Application No. 2013-203007 filed Sep. 30, 2013, which is incorporated herein by reference in its entirety.

BACKGROUND OF THE INVENTION

1. Field of the Invention

The present invention relates to an imaging device.

2. Description of the Related Art

There is disclosed in JP 2010-114879 A an example of background arts of the present invention in the related industrial field. JP 2010-114879 A shows a technology which produces at least one set of a low frequency band limit image and a high frequency band limit image from an original image, extracts a low frequency edge component and a high frequency edge component by applying an edge extraction filter to each of the band limit images, produces one edge component by synthesizing the low frequency edge component and the high frequency edge component, performs edge enhancement of the original image based on the produced edge component, and varies the synthesizing ratio of the low frequency edge component and the high frequency edge component according to the level of the edge enhancement.

SUMMARY OF THE INVENTION

Examples of the chief applicability of an imaging device include a monitoring camera. A monitoring camera enlarges an image of a portion to which particular attention is to be given by zooming operation to allow check of the corresponding portion. For example, a monitoring camera included in an automatic monitoring system enlarges an image of an object detected by motion detection, and a monitoring camera employed for vehicle speed monitoring enlarges an image of a license plate of a targeted vehicle. In addition, a certain type of monitoring camera may be operated by a watchman to enlarge a portion noticed by the watchman. In any situations, it is demanded that an output image from an imaging device is a clear and noise-free image output after appropriate noise removal and edge enhancement. Accordingly, it is preferable that the characteristics of an imaging device associated with noise removal and edge enhancement are variable in accordance with the frequency characteristics of the noise and edge which are changeable by zooming or other conditions.

According to JP 2010-114879 A identified above, no consideration is given to changes of the frequency characteristics of the noise and edge. According to the technology of this reference, adjustment is needed for every image to be produced so as to obtain the optimum image. However, such control is difficult when images are dynamic images produced by a monitoring camera or the like.

It is an object of the present invention to provide an imaging device capable of outputting a clear image even when control conditions of the imaging device such as zooming and iris adjustment are changeable.

In order to solve the above-described object, the configurations described in the claims are adopted. While the present application includes a plurality of means for solving the problems, one example is an imaging device outputting a signal corresponding to an object and obtained by imaging the object, including: an imaging unit imaging the object and generating an electric signal corresponding to the imaged object; a signal processing unit processing the electric signal generated by the imaging unit to generate a video signal; a frequency dividing unit dividing the video signal generated by the signal processing unit into a plurality of frequency components; a noise processing unit performing noise processing for each of the frequency components divided by the frequency dividing unit to output noise processing results; a noise frequency unifying unit unifying the results output from the noise processing unit; an edge processing unit performing edge processing for each of the frequency components divided by the frequency dividing unit to output edge processing results; an edge frequency unifying unit unifying the results output from the edge processing unit; a synthesizing unit synthesizing the results output from the noise frequency unifying unit and the results output from the edge frequency unifying unit; and a control unit controlling operations of constituent elements included in the imaging device, wherein the control unit controls the rates of the noise processing results of the respective frequency components unified by the noise frequency unifying unit, and the rates of the edge processing results of the respective frequency components unified by the edge frequency unifying unit in accordance with control of the operations of the constituent elements included in the imaging device.

According to the invention, there is provided as an advantageous effect an imaging device capable of performing appropriate noise removal and edge enhancement for noise and resolution characteristics whose frequency characteristics are changeable in accordance with imaging conditions such as the position of a zoom lens (wide end and telephoto end), thereby outputting a noise-reduced and clear image even at the time of zooming.

BRIEF DESCRIPTION OF THE DRAWINGS

FIG. 5 illustrates an example of reference parameters retained by a control unit;

FIG. 15 illustrates an example of reference parameters retained by a control unit;

FIG. 18 illustrates an example of reference parameters retained by the control unit.

DESCRIPTION OF THE PREFERRED EMBODIMENTS

Exemplary embodiments according to the invention are hereinafter described with reference to the drawings.

First Embodiment

Figure 1:
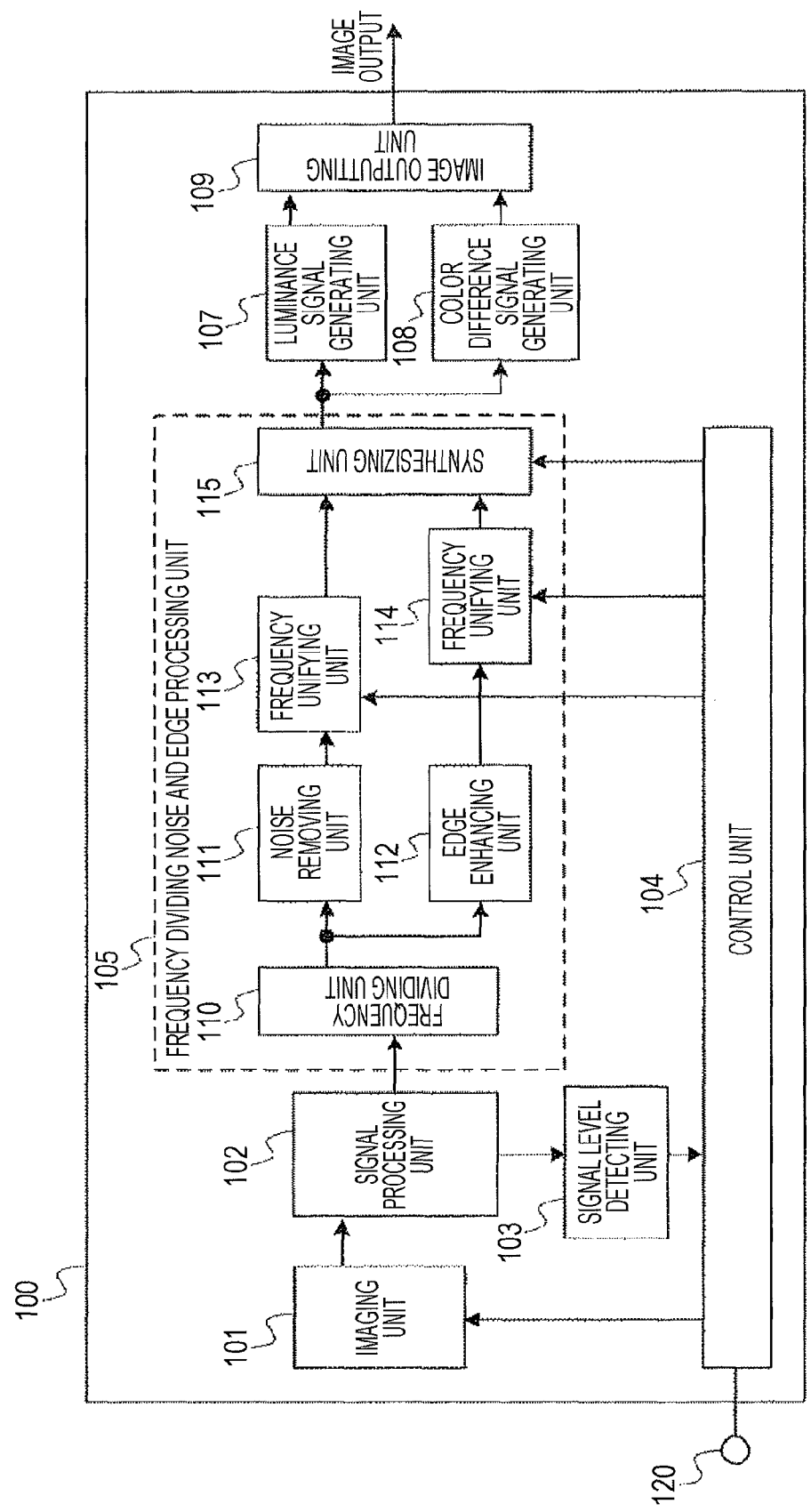
FIG. 1 is a block diagram illustrating the general configuration of an imaging device according to an embodiment.

FIG. 1 is a block diagram illustrating the general configuration of an imaging device according to a first embodiment. This figure illustrates an imaging device 100, an imaging unit 101, a signal processing unit 102, a signal level detecting unit 103, a control unit 104, a frequency dividing noise and edge processing unit 105, a luminance signal generating unit 107, a color difference signal generating unit 108, an image outputting unit 109, and a camera control information input terminal 120. The frequency dividing noise and edge processing unit 105 is constituted by a frequency dividing unit 110, a noise removing unit 111, an edge enhancing unit 112, frequency unifying units 113 and 114, and a synthesizing unit 115. The respective blocks are hereinafter explained one by one.

The imaging unit 101 includes an IR filter cutting infrared light (IR), lens groups containing a zoom lens and a focus lens, an iris, a shutter, an image sensor containing CCD, CMOS or other imaging elements, an amplifier, an AD converter, and other components. The imaging unit 101 converts optical images received by the image sensor into signals by photoelectric conversion, and outputs the signals thus generated.

The signal processing unit 102 performs division and demosaicing for the signals received from the imaging unit 101 to generate video signals for red, blue, green or other colors, and outputs the video signals thus generated. The signal level detecting unit 103 performs integration of the video signal levels, or detection of peak values, for example, to obtain information on the brightness of an imaged image, contrast, or other information on the brightness.

The control unit 104 controls the imaging conditions of the imaging unit 101 based on camera control information input through the camera control information input terminal 120, information on the brightness output from the signal level detecting unit 103, a monitoring program incorporated within the control unit 104, and the like. The imaging conditions involve zoom control for varying the magnification of an imaged image by controlling the lens groups of the imaging unit 101, for example. The monitoring program is a program for allowing a single camera to image both an image corresponding to the overall monitoring range and an image of the details, for example, such as a program for performing zoom and pan controls at fixed intervals of time by interlocked operation with a timer, and a program for detecting motion based on analysis of an imaged image and zooming an object in motion. The control unit 104 controls zooming based on zoom setting information contained in the camera control information input from the camera control information input terminal 120 or instructions from the monitoring program incorporated inside the control unit 104, and sets the magnification of an imaged image to a desired ratio.

The control unit 104 controls the imaging conditions of the imaging unit 101, and also sets control parameters for the frequency unifying units 113 and 114, and the synthesizing unit 115. When the imaging condition is zooming, for example, the control parameters for the frequency unifying units 113 and 114, and for the synthesizing unit 115 are calculated and output based on reference parameters corresponding to the setting values of zooming and retained by the control unit 104.

The frequency dividing noise and edge processing unit 105 performs noise removal and edge enhancement for each of the frequency components of video signals, unifies and synthesizes the frequency components at rates determined for each of the frequency components based on the instructions from the control unit 104 (described later), and then outputs signals after noise removal and edge enhancement. The frequency dividing noise and edge processing unit 105 performs processing for every output of video signals from the signal processing unit 102. For example, when the signals output from the signal processing unit 102 are three signals for red, blue, and green, three units of the frequency dividing noise and edge processing units 105 are equipped to perform processing for the corresponding signals.

The frequency dividing unit 110 divides the video signals received from the signal processing unit 102 into a plurality of frequency components in the horizontal direction and a plurality of frequency components in the vertical direction, and outputs the divided plural frequency components to the noise removing unit 111 and the edge enhancing unit 112. The noise removing unit 111 performs noise processing for each of the input frequency components, and outputs the resultant frequency components to the frequency unifying unit 113. The edge enhancing unit 112 performs edge processing for each of the input frequency components, and outputs the resultant frequency components to the frequency unifying unit 114. The frequency unifying unit 113 unifies the respective frequency components after noise removal in the horizontal direction and the vertical direction at rates determined in accordance with control parameters set by the control unit 104, and outputs the unified frequency components to the synthesizing unit 115 as noise removal data. The frequency unifying unit 114 unifies the respective frequency components after edge enhancement in the horizontal direction and the vertical direction at rates determined in accordance with control parameters set by the control unit 104, and outputs the unified frequency components to the synthesizing unit 115 as edge enhancement data. The synthesizing unit 115 synthesizes the edge enhancement data and the noise removal data at rates determined in accordance with parameters set by the control unit 104, and outputs the synthesized data to the luminance signal generating unit 107 and the color difference signal generating unit 108.

The luminance signal generating unit 107 synthesizes correction signals output from the frequency dividing noise and edge processing unit 105 using a conversion equation for converting color signals to luminance signals when the correction signals are color signals for red, blue, and green, for example, and outputs luminance signals thus generated. The color difference signal generating unit 108 synthesizes correction signals output from the frequency dividing noise and edge processing unit 105 using a conversion equation for converting color signals to color difference signals when the correction signals are color signals for red, blue, and green, for example, and outputs color difference signals thus generated. The image outputting unit 109 outputs the luminance signals received from the luminance signal generating unit 107, and the color difference signals received from the color difference signal generating unit 108 to the external of the imaging device 100, or generate video signals by synthesizing the luminance signals and the color difference signals and outputs the generated video signals to the external of the imaging device 100.

The imaging device 100 according to the invention as discussed above can perform appropriate correction even when noise frequency characteristics and resolution characteristics of images changeable according to the imaging conditions are varied, thereby producing high-quality images. For example, the change of the zoom lens of the imaging unit 101 from the wide side to the telephoto side lowers the resolution characteristics of the lens, thereby decreasing the amount of light to be obtained. The characteristics of the lens are determined by the setting value of zoom. Accordingly, the imaging device provided according to the invention appropriately controls the rates of the frequency components unified by the frequency unifying unit 113 for noise removal, the rates of the frequency components unified by the frequency unifying unit 114 for edge enhancement, and the rates of the signals after noise removal and the signals after edge enhancement synthesized by the synthesizing unit 115 in accordance with the setting value of zoom, so as to output noise-reduced images having high resolution.

In the foregoing description, the condition of the zoom lens has been discussed as one of examples of the control conditions. However, as well as the condition of the zoom lens, the noise characteristics and the edge characteristics to be enhanced are similarly variable in accordance with other imaging conditions associated with brightness, such as attachment and detachment of the IR filter, changes of the gain settings of the iris, shutter, and amplifier, and other changes. Similarly to the case of zoom control, the control unit 104 can perform noise removal and edge enhancement appropriate for the respective imaging conditions by retaining reference parameters corresponding to the respective setting values of the imaging conditions other than zoom control, and calculating and setting parameters for controlling the frequency unifying unit 113, the frequency unifying unit 114, and the synthesizing unit 115 for each of changes of the setting values.

When there exists a combination of plural imaging conditions handled at a time, it is performed to set reference parameters corresponding to the combination of the plural conditions, or multiply control parameters calculated for the respective imaging conditions so as to realize noise removal and edge enhancement appropriate for the plural imaging conditions.

The details of the respective blocks included in the imaging device 100 are now described.

An example of respective constituent elements included in the imaging unit 101 is hereinafter detailed with reference to the drawings.

Figure 2:
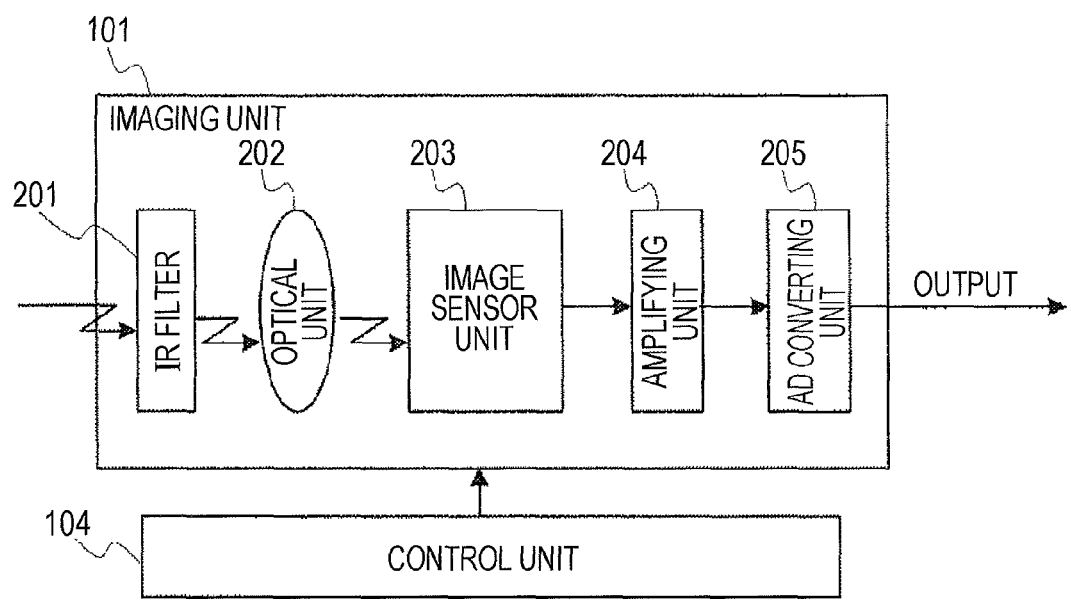
FIG. 2 is a block diagram illustrating a configuration example of an imaging unit.

FIG. 2 is a block diagram illustrating a configuration example of the imaging unit 101. Constituent elements similar to the corresponding constituent elements illustrated in FIG. 1 are given similar reference numerals. The imaging unit 101 includes an IR filter 201 cutting infrared light (IR) component of incident light, an optical unit 202, an image sensor unit 203, an amplifying unit 204 amplifying signal levels, and an AD converting unit 205 converting analog signals into digital signals, for example. Insertion and non-insertion of the IR filter 201 can be switched under the control of the control unit 104. When the IR filter 201 is inserted, incident light from which infrared light is cut off enters the image sensor unit 203 via the optical unit 202. When the IR filter 201 is not inserted, incident light containing infrared light enters the image sensor unit 203 via the optical unit 202. The image sensor unit 203 performs photoelectric conversion, and outputs signals in correspondence with the amount of light received by the image sensor unit 203. The image sensor unit 203 also obtains color information from pixels arranged such that each of the pixels formed on the same image sensor has sensitivity to a wavelength of the corresponding one of red, blue, and green lights, for example. The optical unit 202 is a zoom lens, for example. The optical unit 202 controls the position of the lens as necessary, and forms an image enlarged by varying the focal distance of the lens.

Figure 3:
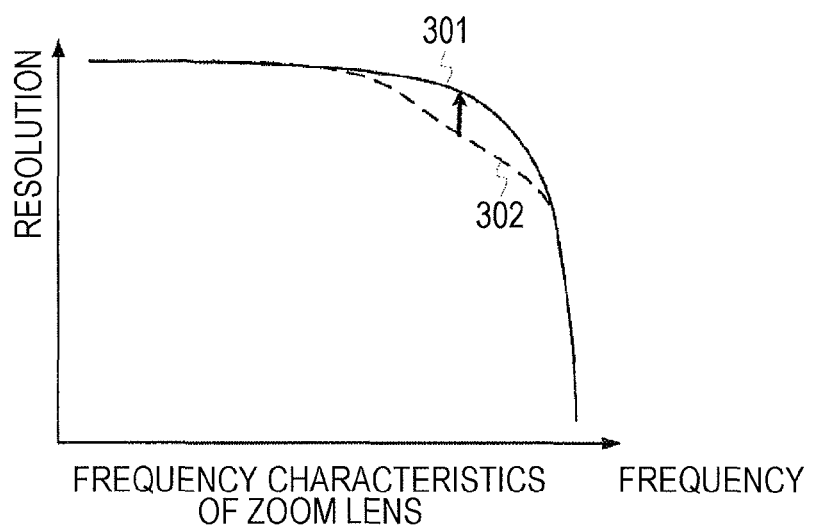
FIG. 3 illustrates an example of frequency characteristics of a zoom lens.

FIG. 3 illustrates the frequency characteristics of the zoom lens. A reference numeral 301 designates an example of a wide side frequency characteristics curve, while a reference numeral 302 designates an example of telephoto side frequency characteristics. When the zoom lens is on the telephoto side, the resolution in the high frequency band lowers. However, the resolution can be improved in appearance by enhancing the edge of the resolution-lowered frequency band. When imaging an image on the telephoto side, the control unit 104 controls the frequency unifying unit 114 such that the resolution of the edge of the high frequency band at the edge enhancing unit 112 can be raised. In determining rates for this control, the control unit 104 may control representative values of several blocks divided between the zoom side and the wide side, or may interpolate intermediate values based on the respective representative values.

Figure 4:
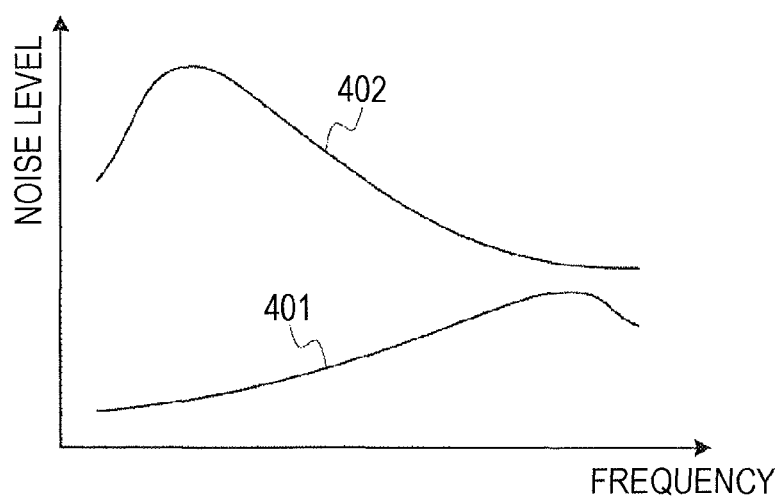
FIG. 4 illustrates an example of settings of the zoom lens and noise levels.

FIG. 4 illustrates an example of respective noise characteristics of signals output from the imaging unit 101 when the zoom lens is positioned at the wide end and when the zoom lens is positioned at the telephoto end. A reference numeral 401 designates an example of the wide side characteristics, while a reference numeral 402 designates an example of the telephoto side characteristics. When the zoom lens is located at the wide end, a sufficient amount of light is secured. Accordingly, the necessity of raising gains in the downstream processing is eliminated, in which condition noise decreases. Moreover, the high-frequency components relatively increase due to the lens characteristics. When the zoom lens is located at the telephoto end, the amount of light for the lens becomes smaller than the amount of light obtained at the wide end. Accordingly, gains need to be raised in the downstream processing, in which condition noise relatively increases. Moreover, the low-frequency components relatively increase due to the lens characteristics.

In consideration of the characteristics illustrated in FIGS. 3 and 4, the control unit 104 retains reference parameters in advance. These reference parameters are referred to for calculation of control parameters based on which the frequency dividing noise and edge processing unit 105 is controlled. FIG. 5 illustrates an example of reference parameters to be retained.

Figure 6:
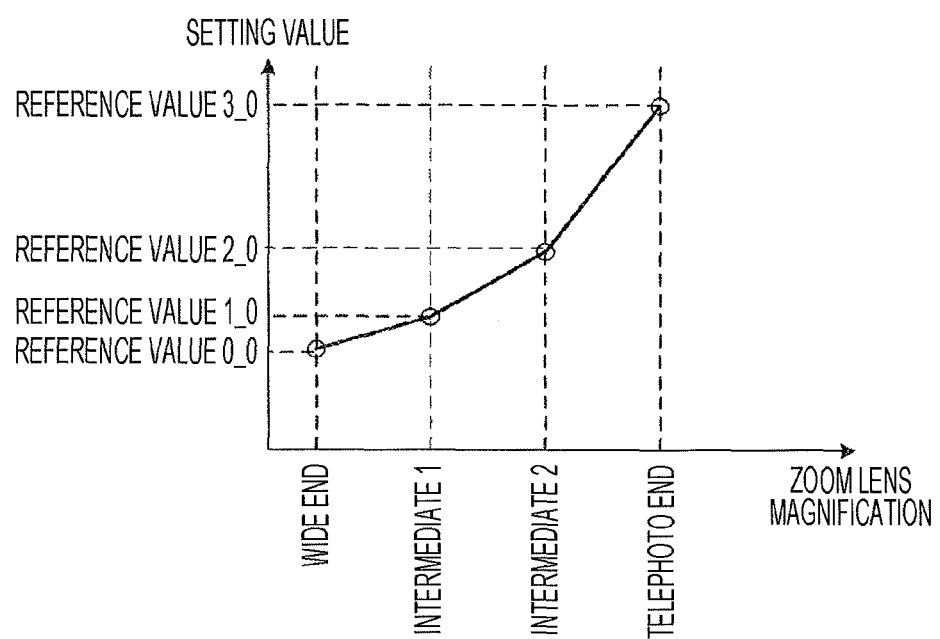
FIG. 6 illustrates an example of interpolation of reference parameters retained by the control unit.

FIG. 5 illustrates an example of calculated reference values for noise and edge processing, where signals are divided into three frequency components of component 1, component 2, and component 3, and individually processed based on characteristics exhibited at magnifications of the zoom lens located at four points. The frequency bands of the component 1, component 2, and component 3 are a high frequency band component, a middle frequency band component, and a low frequency band component, respectively, for example. Parameters to be retained for the respective magnifications of the zoom lens are parameters corresponding to the wide end and the telephoto end, and two additional positions of intermediate position 1 and intermediate position 2. The control unit 104 determines parameter setting values for the frequency dividing noise and edge processing unit 105 by interpolation between the four reference values of the wide end, telephoto end, intermediate position 1, and intermediate position 2. FIG. 6 is a graph illustrating the relationship between the zoom magnifications and the setting values according to an example of interpolation. FIG. 6 is a graph example illustrating calculation of the parameter setting value for the component 1 of the frequency unifying unit 113 on the noise removal side in FIG. 5. As can be understood, the control parameters to be set for the frequency dividing noise and edge processing unit 105 are determined when the magnification of the zoom lens is determined. The other control parameters for the frequency unifying unit 113 and the control parameters for the frequency unifying unit 114 and the synthesizing unit 115 may be calculated in similar manners based on this conception.

When simplification of the processing performed by the control unit 104 is needed, reference parameters at a magnification close to the actual magnification may be selected and determined as control parameters without interpolation. When there is room for the processing capacity of the control unit 104, the number of parameters retained by the control unit 104 may be increased so as to provide more detailed control. According to this embodiment, only the zoom lens is discussed as the imaging condition. However, when conditions other than the zoom lens are added, parameters are determined in consideration of other conditions as well as the magnification of the zoom lens.

Figure 7:
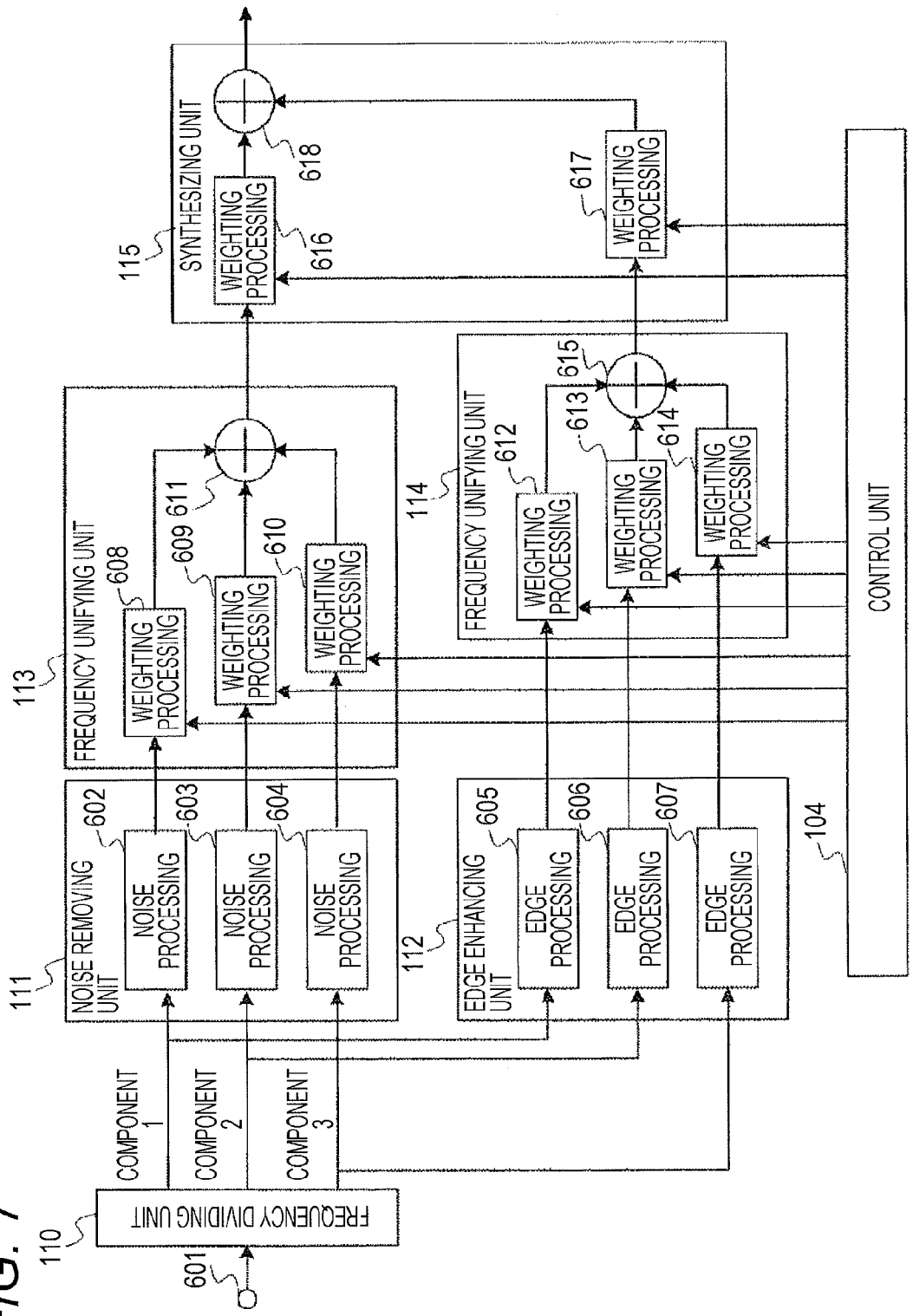
FIG. 7 is a block diagram illustrating a configuration example of a frequency dividing noise and edge processing unit.

FIG. 7 illustrate an example of the frequency dividing noise and edge processing unit 105 employed when signals discussed in conjunction with FIG. 5 are divided into three frequency components. Constituent elements similar to the corresponding constituent elements in FIG. 1 are given similar reference numerals, and the same explanation is not repeated. FIG. 7 illustrates a signal input terminal 601 to which video signals are input from the signal processing unit 102, noise processing units 602, 603, and 604 of the noise removing unit 111, edge processing units 605, 606, and 607 of the edge enhancing unit 112, weighting processing units 608, 609, and 610 of the frequency unifying unit 113, an adding unit 611, weighting processing units 612, 613, and 614 of the frequency unifying unit 114, an adding unit 615, weighting processing units 616 and 617 of the synthesizing unit 115, and an adding unit 618.

The frequency dividing unit 110 divides signals into three frequencies of component 1, component 2, and component 3. The frequency bands of the component 1, component 2, and component 3 are a high frequency band component, a middle frequency band component, and a low frequency band component, respectively, for example. The noise processing unit 602 detects noise of the component 1 and removes the noise from the component 1, and outputs the component 1 to the weighting processing unit 608. The noise processing unit 603 detects noise of the component 2 and removes the noise from the component 2, and outputs the component 2 to the weighting processing unit 609. The noise processing unit 604 detects noise of the component 3 and removes the noise from the component 3, and outputs the component 3 to the weighting processing unit 610. The edge processing unit 605 detects the edge of the component 1, and outputs the component 1 to the weighting processing unit 612. The edge processing unit 606 detects the edge of the component 2, and outputs the component 2 to the weighting processing unit 613. The edge processing unit 607 detects the edge of the component 3, and outputs the component 3 to the weighting processing unit 614. The weighting processing unit 608, the weighting processing unit 609, and the weighting processing unit 610 determine the rates of the respective frequency components in accordance with the control parameters set by the control unit 104, and output the results to the adding unit 611. The weighting processing unit 612, the weighting processing unit 613, and the weighting processing unit 614 determine the rates of the respective frequency components in accordance with the control parameters set by the control unit 104, and output the results to the adding unit 615. The adding unit 611 adds the respective components, and outputs the result to the weighting processing unit 616. The adding unit 615 adds the respective components, and outputs the result to the weighting processing unit 617. The weighting processing unit 616 and the weighting processing unit 617 determine the rates of synthesis of the noise removal components and the edge enhancement components, and output the result to the adding unit 618. The adding unit 618 synthesizes the noise removal components and the edge enhancement components, and outputs signals as an output from the frequency dividing noise and edge processing unit 105.

Accordingly, each of the frequency components divided by the frequency dividing unit 110 is weighted in the processing of noise removal and edge enhancement by the function of the frequency dividing noise and edge processing unit 105 discussed above, wherefore appropriate correction is made to the frequency characteristics of an imaged image variable in accordance with zoom control.

Figure 8:
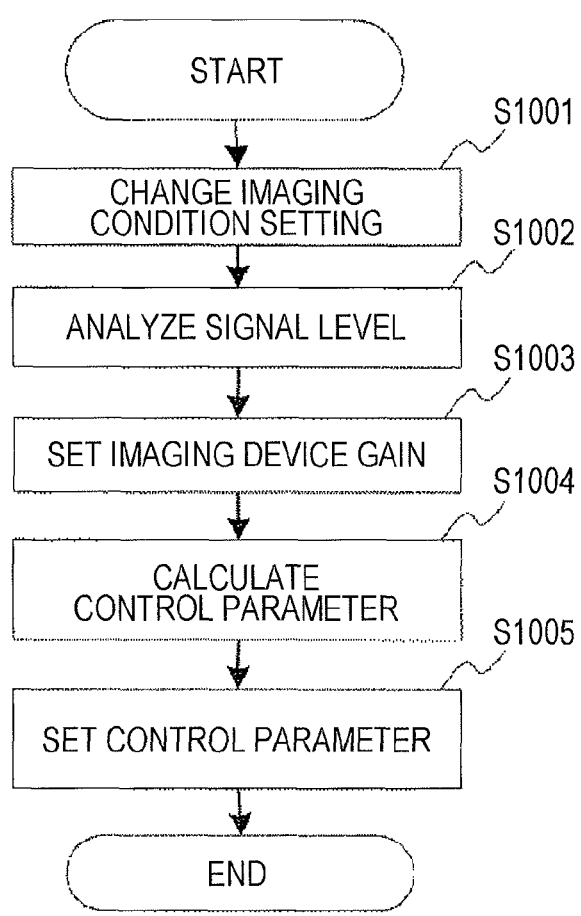
FIG. 8 illustrates an example of a process flow performed by the control unit according to the embodiment.

FIG. 8 is a flowchart illustrating an example of a process flow performed by the control unit 104 of the imaging device 100. When receiving input of the result of external control or internal processing for varying the imaging condition, such as a request for a change of the zoom magnification, the control unit 104 starts a noise and edge parameter changing process.

In step S1001, the control unit 104 changes the setting of the imaging condition. For example, when the imaging condition to be changed is the zoom setting, the control unit 104 sets the zoom of the optical unit 202 to a desired magnification.

In step S1002, the control unit 104 analyzes the signal level detected by the signal level detecting unit 103 to optimize the signal level for an output image.

In step S1003, the control unit 104 sets the imaging device gains for controlling the operation of the optical unit 202 or the amplifying unit 204 as necessary based on the analysis result in step S1002.

In step S1004, the control unit 104 calculates control parameters for the frequency unifying unit 113, the frequency unifying unit 114, and the synthesizing unit 115 based on the reference parameters corresponding to the camera setting set in step S1001.

In step S1005, the control unit 104 sets the control parameters calculated in step S1004 for the frequency unifying unit 113, the frequency unifying unit 114, and the synthesizing unit 115.

As can be seen from the foregoing process flow, the control unit 104 calculates and sets the control parameters for the frequency unifying unit 113, the frequency unifying unit 114, and the synthesizing unit 115, and performs the optimum noise removal and edge enhancement every time the imaging condition is changed.

Figure 9:
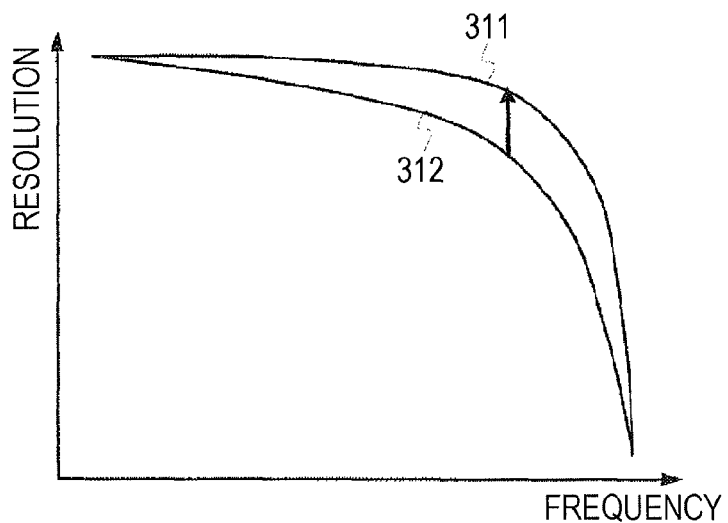
FIG. 9 illustrates an example representing the difference between the resolution characteristics of an imaged image when an infrared filter is attached, and the resolution characteristics of an imaged image when the infrared filter is not attached.

According to the description herein, the control of the zoom lens of the optical unit 202 has been discussed as an example of the imaging conditions. However, the noise removal and edge enhancement can be optimized by varying the reference parameters in similar manners at the time of changes of the presence or absence of the IR filter 201, and the iris control which similarly change the resolution characteristics of the imaged image. FIG. 9 illustrates an example of the frequency characteristics of an imaged image in both cases when the IR filter 201 is present and when the IR filter 201 is absent. A reference numeral 311 designates an example of the frequency characteristics when the IR filter 201 is not attached. A reference numeral 312 designates an example of the frequency characteristics when the IR filter 201 is attached. The resolution of the imaged image decreases when the IR filter 201 is attached in comparison with the resolution when the IR filter 201 is not attached. In this case, the resolution at the time of the absence of the IR filter 201 is similar to the resolution at the time of the wide side of the zoom lens, while the resolution at the time of the presence of the IR filter is similar to the resolution at the time of the telephoto side of the zoom lens. Accordingly, the noise removal and edge enhancement can be optimized for both the cases of the presence and absence of the IR filter 201 by setting control parameters in similar manners to the setting of the control parameters for the telephoto side and the wide side of the zoom lens.

According to the imaging device in the embodiment described herein, the imaging conditions are determined, and noise removal and edge enhancement are performed for each of the frequency components. Furthermore, the respective frequency components are weighted at the time of unification of the frequencies. By this method, the imaging device can achieve noise removal and edge enhancement optimized for the operation including zooming, and therefore can produce constant output of images having high visibility.

Second Embodiment

Figure 10:
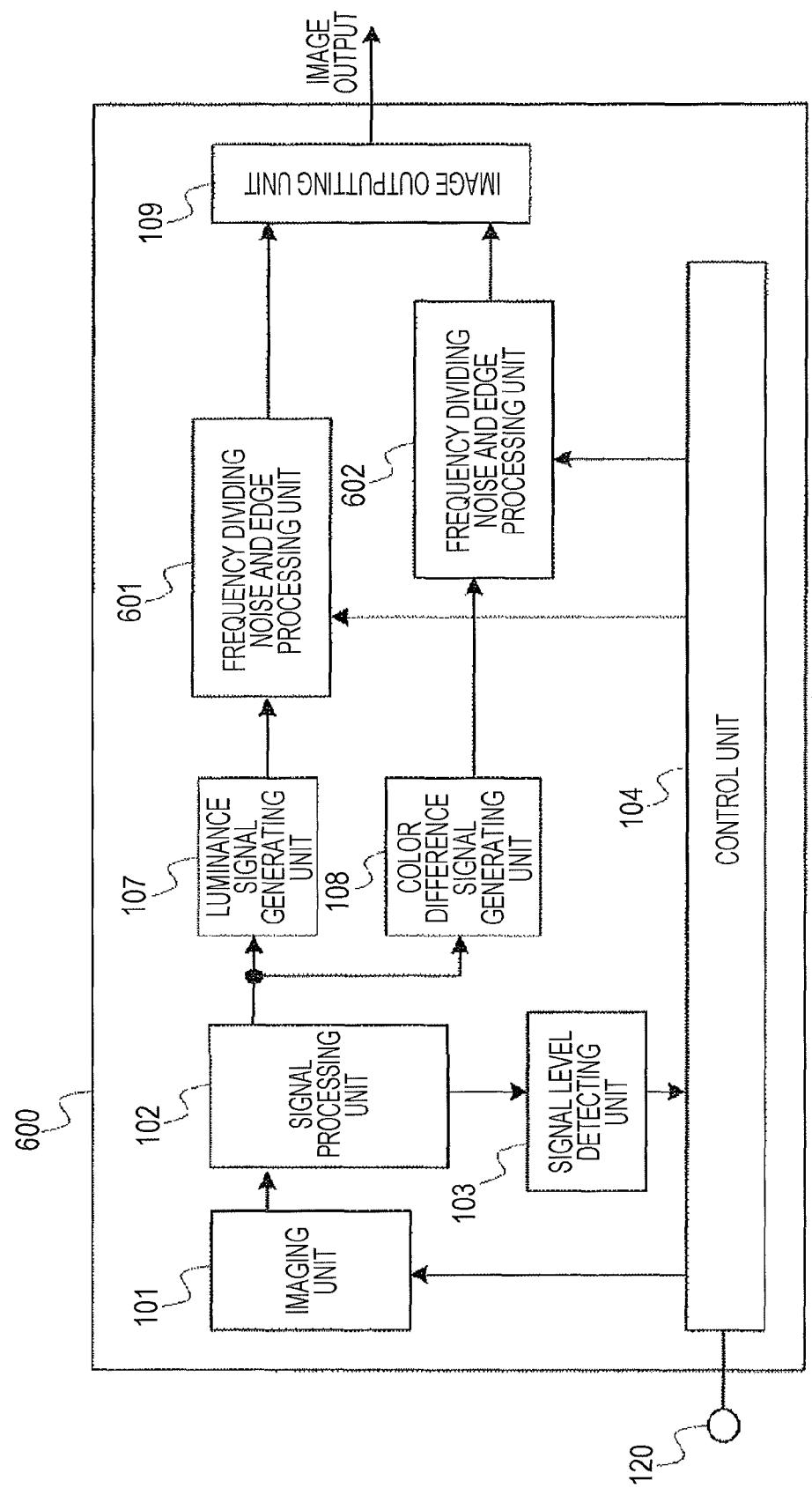
FIG. 10 is a block diagram illustrating the general configuration of an imaging device according to an embodiment.

FIG. 10 is a block diagram illustrating the general configuration of an imaging device 600 according to a second embodiment. Constituent elements similar to the corresponding constituent elements in FIG. 1 are given similar reference numerals, and the same explanation is not repeated. FIG. 10 illustrates the imaging device 600, and frequency dividing noise and edge processing units 601 and 602. The configuration and operation of each of the frequency dividing noise and edge processing unit 601 and the frequency dividing noise and edge processing unit 602 are similar to the corresponding configuration and operation of the frequency dividing noise and edge processing unit 105, wherefore the explanation of these components is omitted.

The imaging device 600 generates video signals at the signal processing unit 102, and outputs the video signals to the luminance signal generating unit 107 and to the color difference signal generating unit 108. The luminance signal generating unit 107 produces luminance signals from the video signals, and outputs the luminance signals to the frequency dividing noise and edge processing unit 601. The color difference signal generating unit 108 produces color difference signals from the video signals, and outputs the color difference signals to the frequency dividing noise and edge processing unit 602. The frequency dividing noise and edge processing unit 601 divides the luminance signals into frequency components, and performs noise removal and edge enhancement for the respective frequency components. Then, the frequency dividing noise and edge processing unit 601 weights the respective frequency components based on the control parameters set by the control unit 104, unifies the weighted frequency components, and outputs the resultant frequency components to the image outputting unit 109 as luminance signals. The frequency dividing noise and edge processing unit 602 divides the color difference signals into frequency components, and performs noise removal and edge enhancement for the respective frequency components. Then, the frequency dividing noise and edge processing unit 602 weights the respective frequency components based on the control parameters set by the control unit 104, unifies the weighted frequency components, and outputs the resultant frequency components to the image outputting unit 109 as color difference signals.

According to this embodiment discussed herein, the imaging device individually controls the frequency characteristics of the luminance signals and the frequency characteristics of the color signals in consideration that the luminance signals and the color signals have optimum resolution characteristics different from each other. Accordingly, the imaging device can produce high-quality images having excellent visibility. According to this embodiment, the frequency dividing noise and edge processing units are disposed after the luminance signal generating unit and the color difference signal generating unit. However, when the frequency dividing noise and edge processing units are provided both before and after the luminance signal generating unit and the color difference signal generating unit, optimum noise removal and luminance and color processing are performed in the initial stage. In this case, the visibility of images to be produced can further improve.

Third Embodiment

Figure 11:
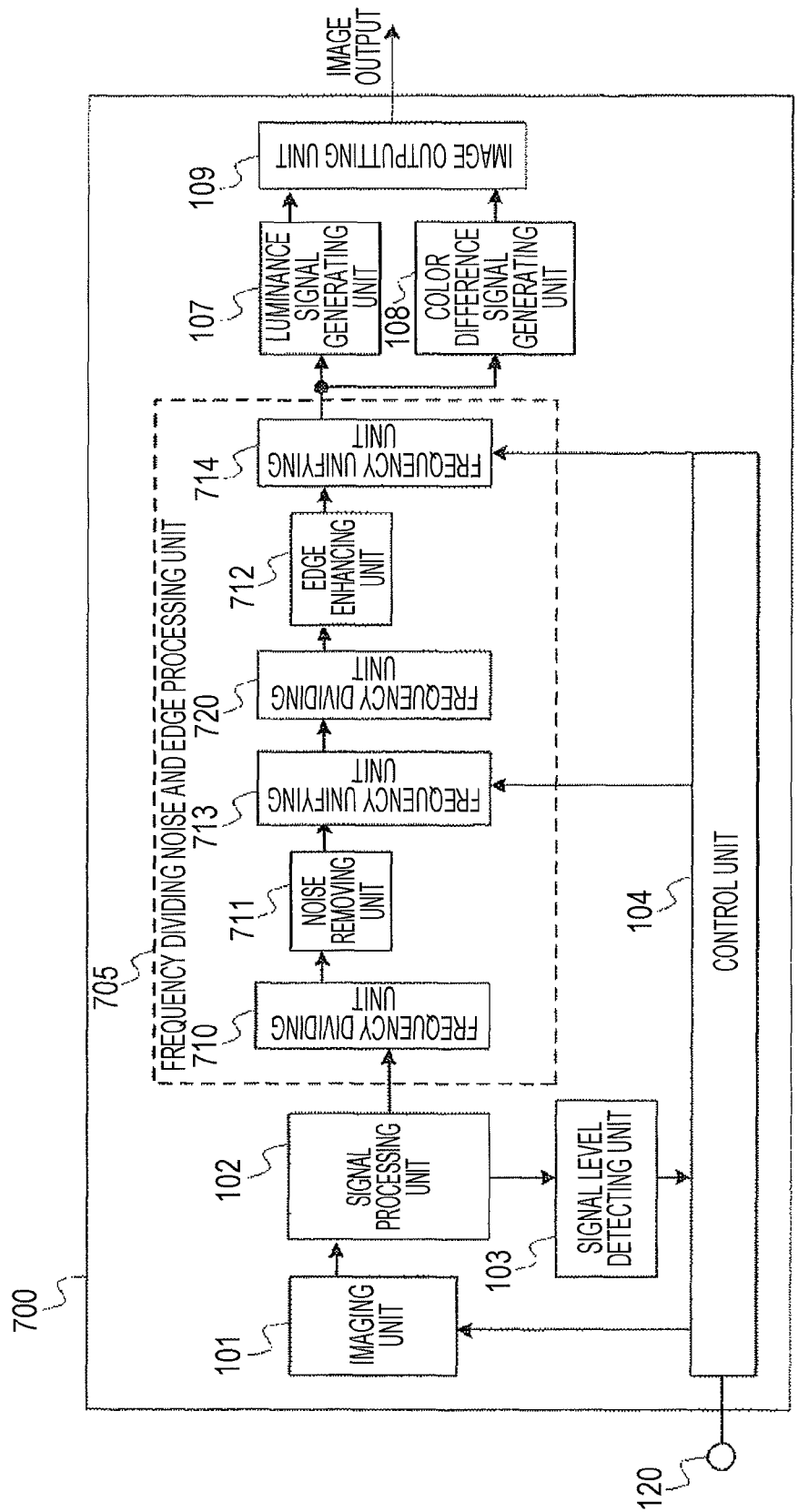
FIG. 11 is a block diagram illustrating the general configuration of an imaging device according to an embodiment.

FIG. 11 is a block diagram illustrating the general configuration of an imaging device 700 according to a third embodiment. Constituent elements similar to the corresponding constituent elements in FIG. 1 are given similar reference numerals, and the same explanation is not repeated. FIG. 11 illustrates the imaging device 700, and a frequency dividing noise and edge processing unit 705. FIG. 11 further illustrates frequency dividing units 710 and 720, frequency unifying units 713 and 714, a noise removing unit 711, and an edge enhancing unit 712.

The frequency dividing noise and edge processing unit 705 performs noise removal for each of the frequency components of video signals, and then performs edge enhancement for each of the frequency components of the video signals. Thereafter, the frequency dividing noise and edge processing unit 705 outputs the signals after noise removal and edge enhancement.

The frequency dividing unit 710 divides the video signals received from the signal processing unit 102 into a plurality of frequency components in the horizontal direction and a plurality of frequency components in the vertical direction, and outputs the divided plural frequency components to the noise removing unit 711. The noise removing unit 711 performs noise removal for each of the input frequency components, and outputs the resultant components to the frequency unifying unit 713. The frequency unifying unit 713 unifies the respective frequency components after noise removal at rates determined in accordance with parameters set by the control unit 104, and outputs the unified frequency components to the frequency dividing unit 720 as noise removal data. The frequency dividing unit 720 divides the video signals after noise removal into a plurality of frequency components in the horizontal direction and a plurality of frequency components in the vertical direction, and outputs the divided plural frequency components to the edge enhancing unit 712. The edge enhancing unit 712 performs edge enhancement for each of the received frequency components, and outputs the resultant frequency components to the frequency unifying unit 714. The frequency unifying unit 714 unifies the respective frequency components after edge enhancement at rates determined in accordance with parameters set by the control unit 104, and outputs the unified frequency components to the luminance signal generating unit 107 and to the color difference signal generating unit 108 as output from the frequency dividing noise and edge processing unit 705.

According to this embodiment discussed herein, the edge enhancement is performed after the noise removal. In this case, the possibility of amplification of noise at the edge-enhanced portion decreases. Moreover, division of the frequency components may be individually determined in different manners for noise removal and for edge enhancement. Accordingly, noise removal and edge enhancement become further optimized.

Fourth Embodiment

Discussed herein is an example of an imaging device which performs frequency dividing noise and edge enhancement processing for each of divided blocks.

Figures 12, 13:
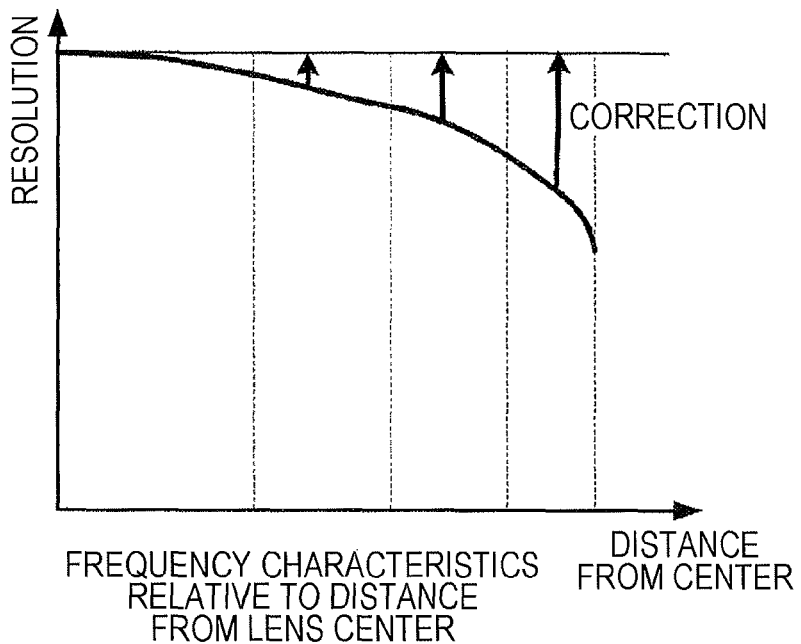
FIG. 12 illustrates an example of frequency characteristics of a lens.
FIG. 13 illustrates an example of division of an imaged image into blocks.

In general, the resolution characteristics of a lens are lower at the periphery of the lens than at the center of the lens. FIG. 12 illustrates an example of the relationship between the frequency characteristics and the distance from the center of a lens. The resolution of a lens decreases as the distance from the center increases. Accordingly, an imaged image improves when individual correction is made in correspondence with the use position of the lens similarly to the correction made in correspondence with the wide side and telephoto side of the zoom lens. The imaging position of the lens corresponds to the position on the imaged image. More specifically, an image imaged at the center of the lens corresponds to the center of the imaged image, while an image imaged at a peripheral position of the lens corresponds to a peripheral position of the imaged image. Accordingly, when noise removal and edge enhancement are performed for the imaged image in accordance with the distance from the center, the high-quality imaged image throughout the screen can be obtained. It is difficult to retain reference parameters for correction for all the pixels of the imaged image and complete a considerable volume of processing required thereby. For reduction of the processing volume, the screen may be divided into blocks so that control can be performed only for a volume of processing determined for each block. FIG. 13 illustrates an example of division of a screen. A reference numeral 1201 designates an imaged image. FIG. 13 illustrates an example which divides a screen into 7 blocks in the horizontal direction, and 5 blocks in the vertical direction, thereby dividing the screen into 35 blocks in total. The blocks may be divided into uniform blocks, or may be divided into large blocks in the central area, and small blocks in the peripheral area, for example, depending on the characteristics of the lens. Each block retains a control parameter. In this case, the block to which a signal for processing belongs is determined, and noise removal and edge enhancement are performed based on the reference parameter of the block to which the signal belongs. Alternatively, the processing parameters may be retained for each of the blocks, and the control parameters may be interpolated at the time of signal processing so as to calculate the control parameters corresponding to the positions of the signals for control. In this case, the volume of processing increases. However, no gaps are produced between respective blocks, wherefore correction becomes further detailed and improves the image quality.

Figure 14:
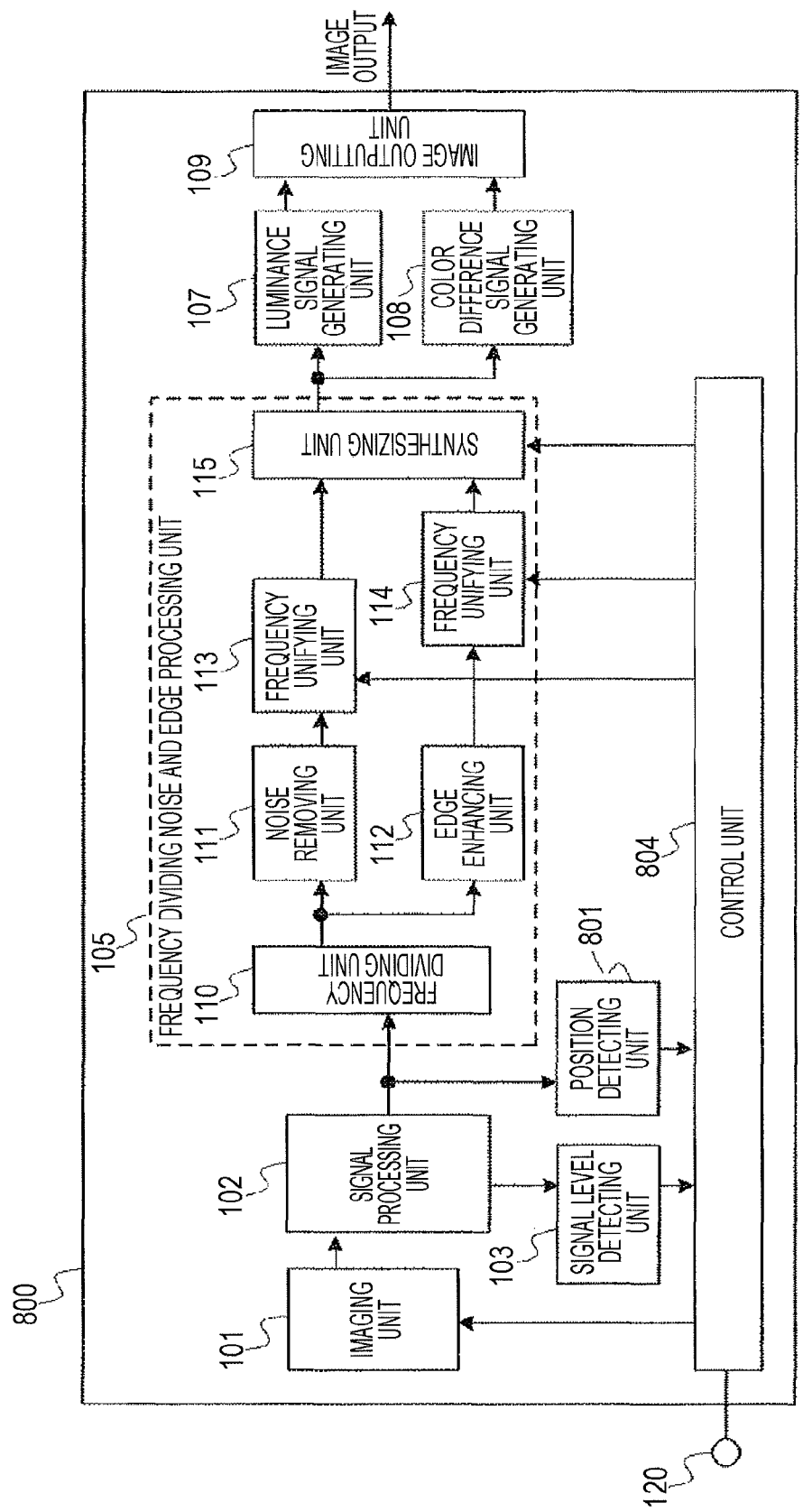
FIG. 14 is a block diagram illustrating the general configuration of an imaging device according to an embodiment.

FIG. 14 is a block diagram illustrating the general configuration of an imaging device 800 according to a fourth embodiment. Constituent elements similar to the corresponding constituent elements in FIG. 1 are given similar reference numerals, and the same explanation is not repeated. A position detecting unit 801 detects the horizontal and vertical positions of signals for processing on the screen, or detects block numbers when the screen is divided into blocks, or the distances from the center. A control unit 804 extracts or calculates correction data corresponding to the positions detected by the position detecting unit 801, and sets control parameters for the frequency dividing noise and edge processing unit 105.

FIG. 15 illustrates an example of reference parameters to be retained. FIG. 15 illustrates reference parameters set in correspondence with respective frequency components for each of the divided blocks. The control unit 804 selects the block to which a video signal for processing belongs based on the position detected by the position detecting unit 801.

Figure 16:
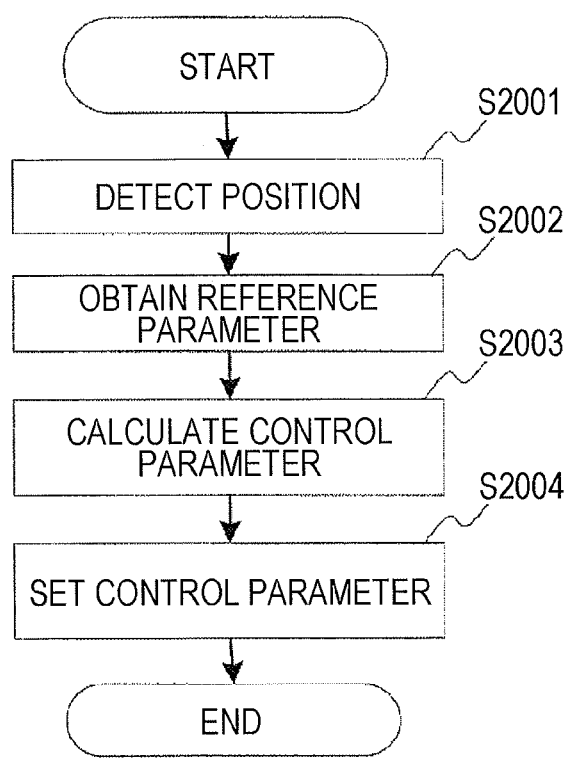
FIG. 16 illustrates an example of a process flow performed by the control unit according to the embodiment.

FIG. 16 illustrates a process flow performed by the control unit 804. When the imaging unit 101 starts imaging an image, the control unit 804 starts processing. In step S2001, the control unit 804 detects the position of a video signal for processing, and selects the block to which the video signal for processing belongs. In step S2002, the control unit 804 obtains reference parameters for the selected block. In step S2003, the control unit 804 calculates control parameters for the frequency unifying unit 113, the frequency unifying unit 114, and the synthesizing unit 115 based on the obtained reference parameters. In step S2004, the control unit 804 sets the calculated control parameters for the frequency unifying unit 113, the frequency unifying unit 114, and the synthesizing unit 115.

According to this embodiment discussed herein, noise removal and edge enhancement can be optimized for the respective positions on the imaged image which has uneven noise characteristics and resolution characteristics depending on the positions on the screen. Accordingly, the high-quality image throughout the screen can be obtained.

Figure 17:
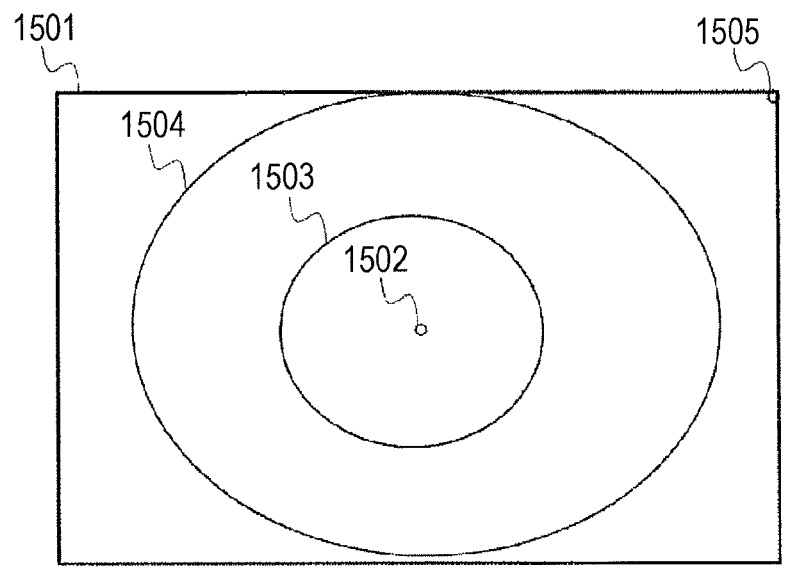
FIG. 17 illustrates an example of division of an imaged image into blocks.

FIG. 17 illustrates another example of division of the screen according to this embodiment. A reference numeral 1501 designates an imaged image. A reference numeral 1502 designates the center of the imaged image. A reference numeral 1503 designates a line corresponding to a distance A from the center of the imaged image. A reference numeral 1504 designates a line corresponding to a distance B from the center of the imaged image. A reference numeral 1505 designates a point corresponding to a distance C from the center of the imaged image. In FIG. 17, the distance A, the distance B, and the distance C are disposed in this order in the direction from the center of the image.

FIG. 18 illustrates an example of reference parameters to be retained according to this embodiment. Reference parameters for respective frequency components are retained in correspondence with the center, the distance A, the distance B, and the distance C. For simplification of the processing, the control unit 804 may divide the screen into a block from the center to an intermediate point between the distance A and the center, a block from the intermediate point between the distance A and the center to an intermediate point between the distance A and the distance B, a block from the intermediate point between the distance A and the distance B to an intermediate point between the distance B and the distance C, and a block from the intermediate point between the distance B and the distance C to the farther area, for example. In this case, the control unit 804 calculates the control parameters for the frequency unifying unit 113, the frequency unifying unit 114, and the synthesizing unit 115 based on the reference parameters contained in the respective blocks.

Furthermore, the control unit 804 may calculate reference parameters corresponding to the positions of video signals for processing by interpolation between the respective reference data, and then calculate control parameters based on the calculated reference parameters.

Figure 19:
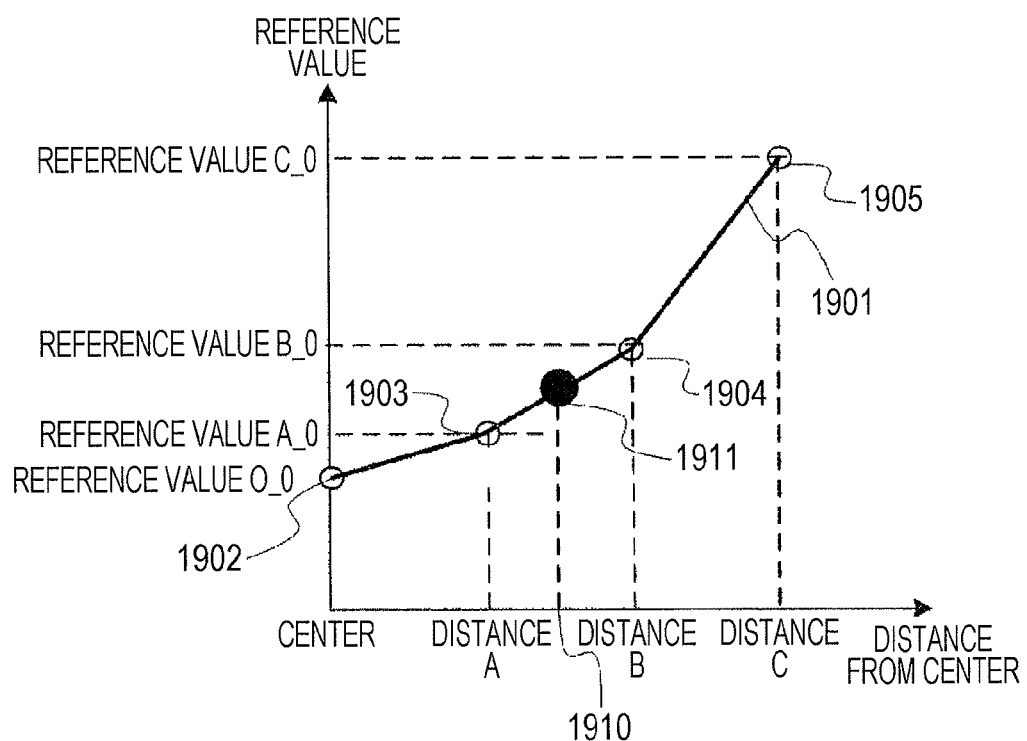
FIG. 19 illustrates an example of interpolation of the reference parameters retained by the control unit.

FIG. 19 is a graph illustrating an example of interpolation between the reference parameters corresponding to the component 1 of the frequency unifying unit 113, for example. A reference numeral 1901 designates a graph illustrating the relationship between reference parameters and the distance from the center. A reference numeral 1902 designates a point O calculated from a reference parameter reference value O_0 at the center. A reference numeral 1903 designates a point A calculated from the distance A and a reference parameter reference value A_0 at the distance A. A reference numeral 1904 designates a point B calculated from the distance B and a reference parameter reference value B_0 at the distance B. A reference numeral 1905 designates a point C calculated from the distance C and a reference parameter reference value C_0 at the distance C. A reference numeral 1910 designates a distance between the center and a video signal for processing. The graph 1901 connects the point O 1902, the point A 1903, the point B 1904, and the point C 1905. In this case, the reference parameter is determined when the detection distance of the video signal from the center is detected. For example, the reference parameter of the video signal at the detection distance 1910 corresponds to a point X 1911 on the line connecting the point A 1903 and the point B 1904. Reference parameters for other frequency components can be obtained in correspondence with the distance between the center and the video signal to be processed by interpolation similar to the interpolation based on the reference parameters of the component 1 of the frequency unifying unit 113 discussed herein. Based on the reference parameters obtained by interpolation, the control unit 804 calculates control parameters for the frequency unifying unit 113, the frequency unifying unit 114, and the synthesizing unit 115.

According to this embodiment described herein, the noise removal and the subsequent edge enhancement are performed at appropriate rates for the respective frequency components in accordance with the display positions on the image. Accordingly, the high-quality image throughout the screen with appropriate treatment of noise removal and edge enhancement can be obtained.

What is claimed is:

1. An imaging device outputting a signal corresponding to an object and obtained by imaging the object, comprising:
an imaging unit imaging the object and generating an electric signal corresponding to the imaged object;
a signal processing unit processing the electric signal generated by the imaging unit to generate a video signal;
a frequency dividing unit dividing the video signal generated by the signal processing unit into a plurality of frequency components;
a noise processing unit performing noise processing for each of the frequency components divided by the frequency dividing unit to output noise processing results;
a noise frequency unifying unit unifying the results output from the noise processing unit;
an edge processing unit performing edge processing for each of the frequency components divided by the frequency dividing unit to output edge processing results;
an edge frequency unifying unit unifying the results output from the edge processing unit;
a synthesizing unit synthesizing the results output from the noise frequency unifying unit and the results output from the edge frequency unifying unit; and
a control unit controlling operations of constituent elements included in the imaging device,
wherein the control unit controls the rates of the noise processing results of the respective frequency components unified by the noise frequency unifying unit, and the rates of the edge processing results of the respective frequency components unified by the edge frequency unifying unit in accordance with control of the operations of the constituent elements included in the imaging device.

2. The imaging device of claim 1, wherein
the imaging unit includes a zoom lens,
the control unit controls the magnification of the zoom lens, and
the control unit controls the rates of the noise processing results of the respective frequency components unified by the noise frequency unifying unit, and the rates of the edge processing results of the respective frequency components unified by the edge frequency unifying unit in accordance with the magnification of the zoom lens.

3. The imaging device of claim 2, wherein
the imaging unit includes an iris control unit,
the imaging device includes a signal level detecting unit detecting the brightness level of an image based on a video signal generated by the signal processing unit,
the control unit controls the iris control unit based on the results output from the signal level detecting unit, and
the control unit controls the rates of the noise processing results of the respective frequency components unified by the noise frequency unifying unit, and the rates of the edge processing results of the respective frequency components unified by the edge frequency unifying unit in accordance with control values of the iris control unit.

4. The imaging device of claim 3, further comprising:
an infrared filter,
wherein
the control unit controls whether the infrared filter is attached to or detached from the imaging unit based on the results output from the signal level detecting unit, and
the control unit controls the rates of the noise processing results of the respective frequency components unified by the noise frequency unifying unit, and the rates of the edge processing results of the respective frequency components unified by the edge frequency unifying unit in accordance with the attachment or detachment of the infrared filter.

5. The imaging device of claim 4, further comprising:
a synthesizing unit synthesizing the results output from the noise frequency unifying unit and the results output from the edge frequency unifying unit,
wherein the control unit controls the rates of the noise processing results of the respective frequency components unified by the noise frequency unifying unit, and the rates of the edge processing results of the respective frequency components unified by the edge frequency unifying unit in accordance with control of operations of the constituent elements included in the imaging device.

6. The imaging device of claim 4, further comprising:
an edge processing frequency dividing unit dividing output from the noise frequency unifying unit into a plurality of frequency components,
wherein the edge processing unit performs edge enhancement for each of the frequency components output from the edge processing frequency dividing unit.

7. The imaging device of claim 4, wherein
the signal processing unit outputs a luminance video signal and a color difference video signal, the frequency dividing unit divides each of the luminance video signal and the color difference video signal into a plurality of frequency components, the noise frequency unifying unit includes a luminance video signal noise frequency unifying unit and a color difference video signal noise frequency unifying unit, the edge frequency unifying unit includes a luminance video signal edge frequency unifying unit and a color difference video signal edge frequency unifying unit, and the control unit individually controls the rates of the noise processing results of the respective frequency components unified by the luminance video signal noise frequency unifying unit, the rates of the noise processing results of the respective frequency components unified by the color difference video signal noise frequency unifying unit, the rates of the edge processing results of the respective frequency components unified by the luminance video signal edge frequency unifying unit, and the rates of the edge processing results of the respective frequency components unified by the color difference video signal edge frequency unifying unit in accordance with control of operations of the constituent elements included in the imaging device.

8. The imaging device of claim 1, further comprising:

a position detecting unit dividing an imaged image into a plurality of areas, and detecting the area or the display position to which a processing target video signal belongs, wherein the control unit controls the rates of the noise processing results of the respective frequency components unified by the noise frequency unifying unit, and the rates of the edge processing results of the respective frequency components unified by the edge frequency unifying unit based on parameters corresponding to the position detection results of the position detecting unit.

* * * * *